United States Patent [19]
Roff et al.

[11] Patent Number: 5,467,419
[45] Date of Patent: Nov. 14, 1995

[54] SUBMOUNT AND CONNECTOR ASSEMBLY FOR ACTIVE FIBER NEEDLE

[75] Inventors: Robert W. Roff, Westfield; Randall B. Wilson, Maplewood, both of N.J.

[73] Assignee: The Whitaker Corporation, Wilmington, Del.

[21] Appl. No.: 257,607

[22] Filed: Jun. 9, 1994

Related U.S. Application Data

[63] Continuation-in-part of Ser. No. 217,516, Mar. 24, 1994.

[51] Int. Cl.$^6$ ..................................... G02B 6/42
[52] U.S. Cl. ........................................ 385/92; 385/93
[58] Field of Search ........................... 385/88–94

[56] References Cited

U.S. PATENT DOCUMENTS

| | | | |
|---|---|---|---|
| 4,033,668 | 7/1977 | Presby | 350/96 C |
| 4,291,942 | 9/1981 | Henry et al. | 385/94 |
| 4,386,268 | 5/1983 | Kock | 385/94 X |
| 4,435,038 | 3/1984 | Soes et al. | 350/96.21 |
| 4,639,077 | 1/1987 | Dobler | 385/92 |
| 4,653,846 | 3/1987 | Yamazaki et al. | 350/96.20 |
| 4,669,820 | 6/1987 | Ten Berge | 350/96.20 |
| 4,702,547 | 10/1987 | Enochs | 350/96.2 |
| 4,711,521 | 12/1987 | Thillays | 385/93 |
| 4,818,056 | 4/1989 | Enochs et al. | 385/88 |
| 4,844,581 | 7/1989 | Turner | 350/96.20 |
| 4,897,711 | 1/1990 | Blonder et al. | 357/74 |
| 4,911,519 | 3/1990 | Burton et al. | 350/96.20 |
| 4,944,569 | 7/1990 | Boudreau et al. | 350/96.20 |
| 4,979,791 | 12/1990 | Bowen et al. | 350/96.17 |
| 4,989,944 | 2/1991 | Tholen et al. | 350/96.18 |
| 4,997,243 | 3/1991 | Aiki et al. | 350/96.2 |
| 5,026,138 | 6/1991 | Boudreau et al. | 350/96.20 |
| 5,046,798 | 9/1991 | Yagiu et al. | 385/92 X |
| 5,068,865 | 11/1991 | Ohshima et al. | 372/36 |
| 5,249,245 | 9/1993 | Lebby et al. | 385/89 |
| 5,276,754 | 1/1994 | Blair et al. | 385/88 |

FOREIGN PATENT DOCUMENTS

| | | | |
|---|---|---|---|
| 0100086 | 2/1984 | European Pat. Off. . | |
| 63-223609 | 9/1988 | Japan | 385/93 |

Primary Examiner—John D. Lee
Attorney, Agent, or Firm—William S. Francos

[57] ABSTRACT

A connector assembly includes an active fiber needle 1 having a passive or active optical device 6 connected to an end face 7 of a thick metallized coating 4 and a cup-shaped mount 10 for hermetically enclosing the optical device. The mount 10 hermetically encloses the optical device 6 and provides heat dissipation and electrical connections for optical device 6. The cup-shaped mount may include a ceramic tubular sleeve hermetically sealed to the metal coating 4 on the fiber needle 1 about a central bore 12A thereof. Electrical connections between the optical device 6 and devices external to the mount may preferably be provided through a spring contact 18 which is soldered to terminals on device 6 and has at least one leg 18A, 18B extending through the hermetically sealed cup-shaped housing 10. Other embodiments of electrical lead connections may be provided by wire bonds 24 between device 6 and external metallization surfaces 26A.

39 Claims, 5 Drawing Sheets

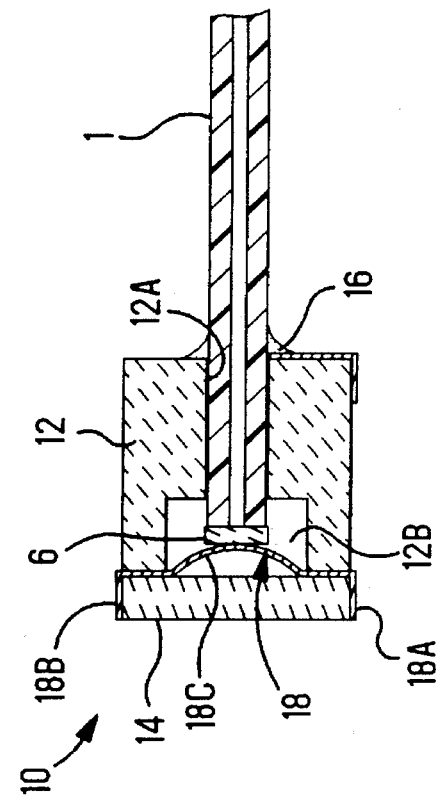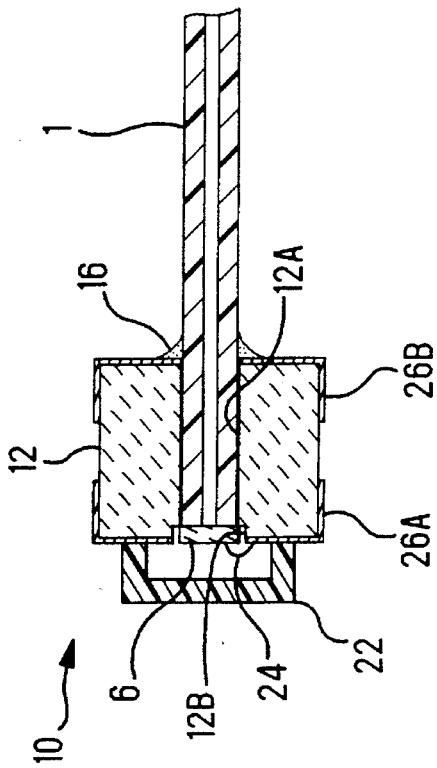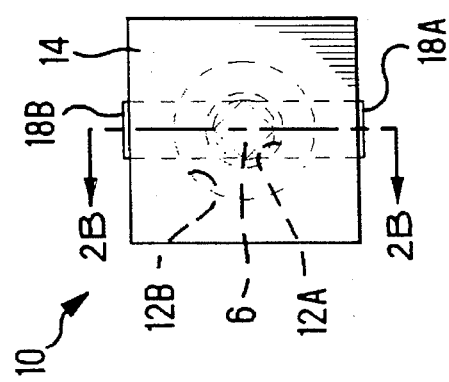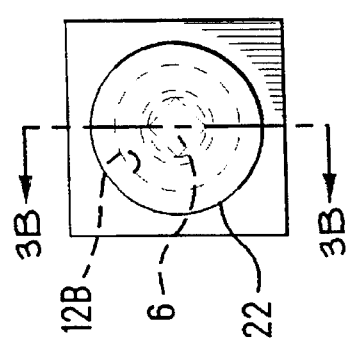

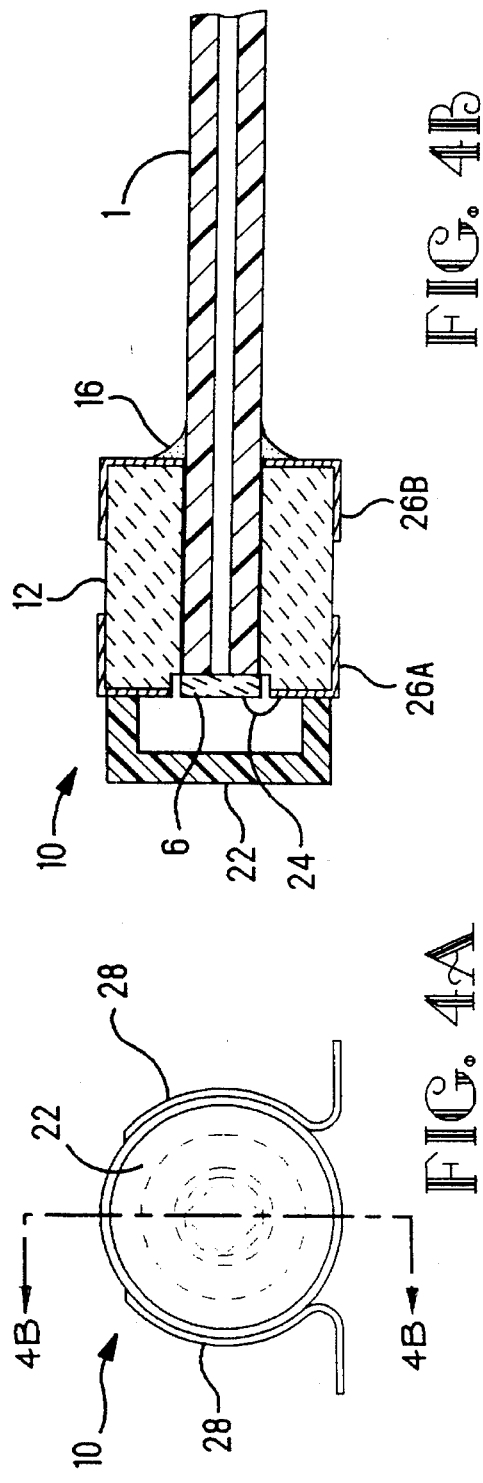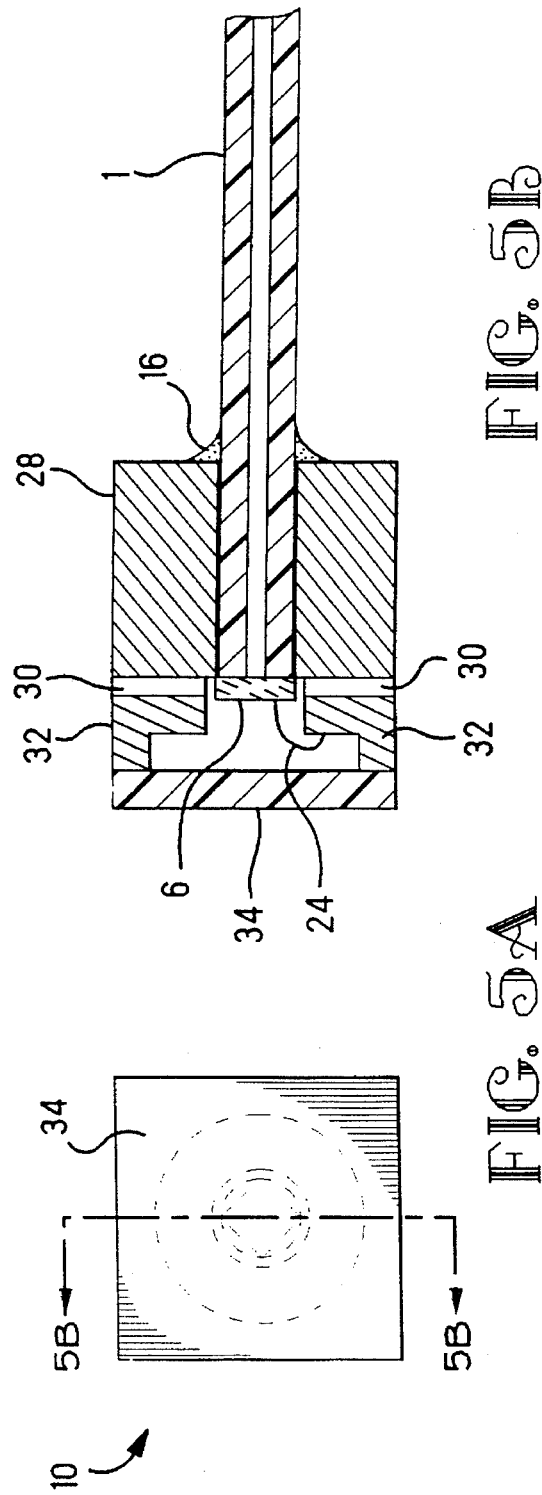

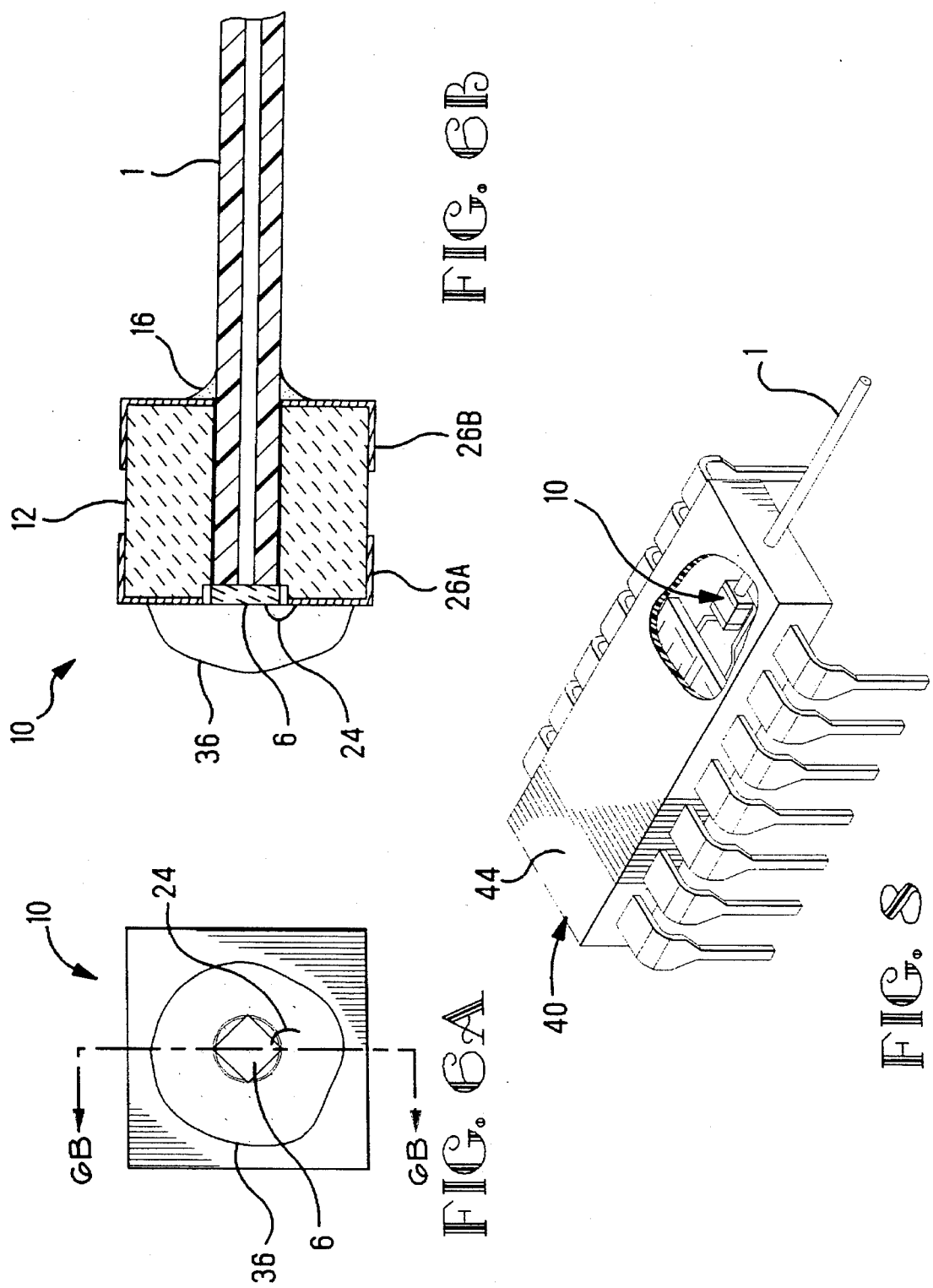

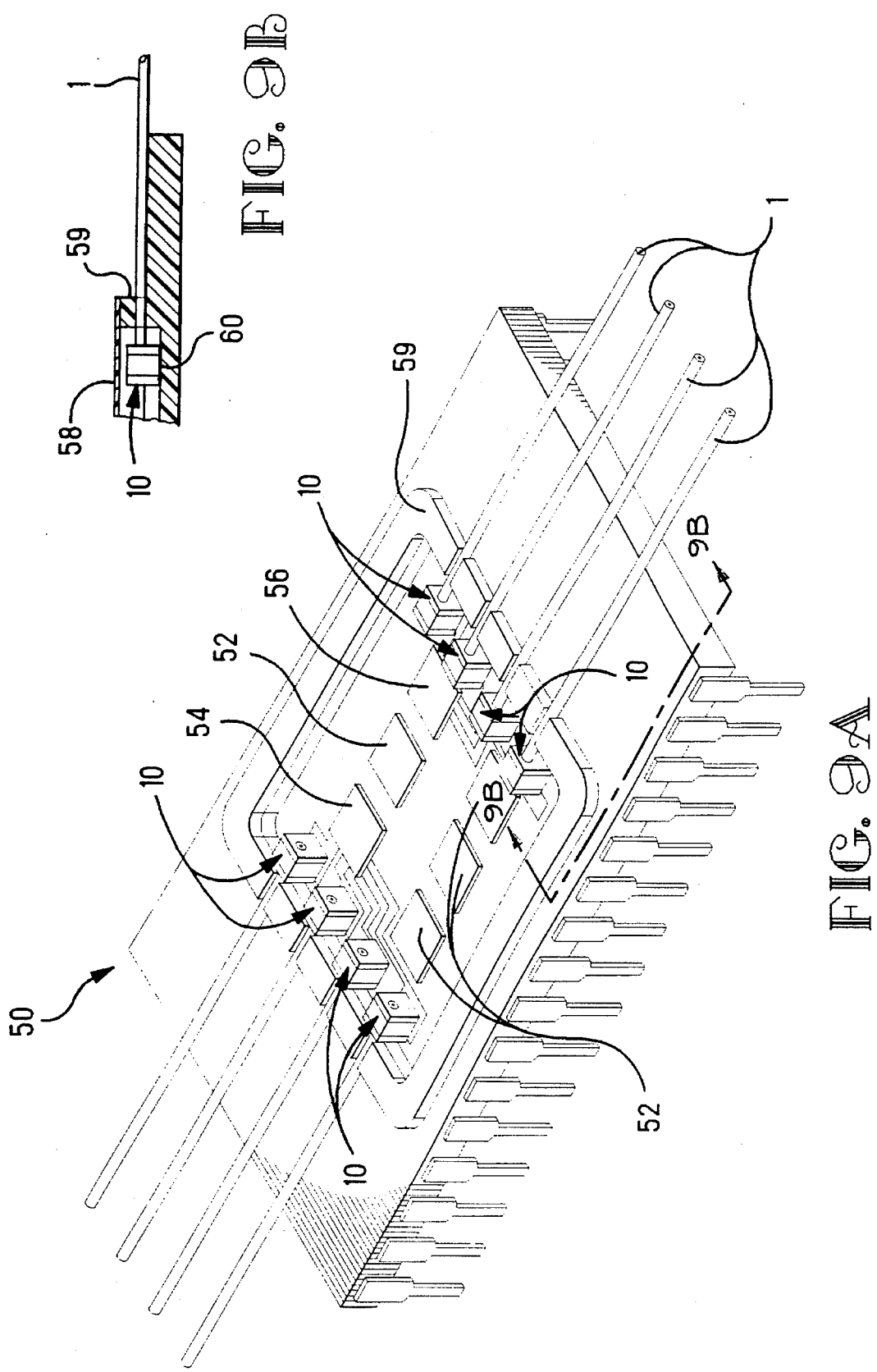

SUBMOUNT AND CONNECTOR ASSEMBLY FOR ACTIVE FIBER NEEDLE

This application is a continuation-in-part of commonly assigned prior application Ser. No. 08/217,516 filed Mar. 24, 1994 by the same inventors entitled "Active Fiber Needle".

FIELD OF THE INVENTION

The invention relates to a novel technique for connecting a fiber optic waveguide to a passive or active optical device and a mount for hermetically enclosing the optical device. Particularly, the invention relates to use of a thick metal circumferential coating about the fiber; whereby an active or passive optical device may be securely bonded and passively aligned to the endface of the metal coated fiber, and a mount which hermetically encloses the optical device and provides heat dissipation and electrical connections for the optical device.

BACKGROUND OF THE INVENTION

Hermetic optical component packaging to date has employed metallic cans into which are disposed optoelectronic devices and with connections made to optical fibers. Typically, the active optoelectronic device is mounted on a submount and the submount is bonded to a metal package. Wire bonds are used to make electrical connections to wire pins which extend from a metal header. A hermetic seam seal is used to bond a metal cap to the header. Generally, the caps are lensed with a ball lens or have an ultra flat glass window or a cap with an optical fiber pigtail.

Lensed cap assemblies are commonly used in an active device amount (ADM) to effect coupling to an optical fiber. Typically, a mating connector containing an optical fiber is attached to the ADM. It is necessary to actively align the ADM and the fiber to the subassembly and then secure the assembly by welding, epoxy or soldering. This is a labor intensive procedure and furthermore there is a yield loss associated with the securing procedure, high costs associated with the packaging and an inherent complexity of the final assembly. All these factors singly and combined result in a high cost end product. Additionally, these assemblies tend to be bulky and are not readily encapsulable to form standard IC type packages.

As discussed in applicants' above-mentioned prior application Ser. No. 08/217,516, metallized fibers, having relatively thin metal coatings, are disclosed in U.S. Pat. No. to 4,033,668 to Presby. Bonding to another fiber or to an optical device is effected by welding or soldering in the radial direction about the outer circumference of the metallized fiber. A separate housing is required to effect coupling between the optical device and the fiber consequently, such an arrangement requires active alignment of the fiber to the device which is inherently labor intensive and bulky in design. In another technique described in U.S. Pat. No. 4,669,820 to Ten Berge, a metallized fiber is disclosed which allows for fiber-fiber and fiber-device coupling by crimping the metallized fiber. Such a technique effects fiber-device coupling via a lens. This is accomplished by disposing the fiber needle and the lens at opposite ends of a metal sleeve. Light from a laser is impingent on the lens for coupling to the fiber.

It is desirable to effect an accurate alignment between a fiber optic waveguide and a device without the aforementioned costs or complexities in assembly. The connector assembly described in applicants' aforementioned application Ser. No. 08/217,516, accomplishes this result.

However, a need in the art also exists for a submount for the active or passive optical device which hermetically encloses the optical device and the associated end of the optical fiber, in order to provide a sealed component package which is surface mountable and permits plastic overmolding. In the case of an active optical device (optoelectronic device) there is a need for a mount which provides good heat dissipation for the optoelectronic device in order to minimize temperature rise therein, and the ability to make electrical connections through the submount while maintaining hermeticity.

SUMMARY OF THE INVENTION

Accordingly, it is a primary object of the present invention to provide a low cost, passively aligned connector assembly and mount for an optical fiber and active or passive optical device which is surface mountable and permits plastic overmolding in an electronic package.

The objects of the invention are fulfilled by providing a mount for an optoelectronic device aligned to a fiber assembly for use in electrically and thermally connecting the aligned optoelectronic device to a circuit in either a hermetic or non-hermetic way comprising a cup-shaped housing having an open end and a closed end with sidewalls therebetween, said cup-shaped housing having a cavity for accommodating a first end of said optical fiber for hermetically enclosing said optoelectronic device and the first end of the fiber; and electrical lead means connectable to said optoelectronic device and extending through said housing for facilitating connection to an external device.

The mount further includes heat dissipation means for providing a heat conductive path from the optoelectronic device and the metal coating on the optical fiber through the mount to a supporting device, e.g. a circuit board.

Advantages of the mount and connector assembly of the present invention are: 1) features that minimize internal temperature rise of the chip of an active optoelectronic device; 2) the ability to bring one or more electrical connections from inside to outside of the submount while maintaining hermeticity; and 3) the ability to make contact and attach a hermetically sealed active optical device using conventional surface mount techniques.

The invention will now be described by way of example, with reference to the drawings.

BRIEF DESCRIPTION OF THE DRAWINGS

FIG. 2A is an end elevational view of a first embodiment of a submount and connector assembly of the present invention;

FIG. 2B is a cross-sectional view taken along line 2B—2B of FIG. 2A;

FIG. 3A is an end elevational view of a second embodiment of a submount and connector assembly of the present invention;

FIG. 3B is a cross-sectional view taken along line 3B—3B of FIG. 3A;

FIG. 4A is an end elevational view of a third embodiment of a submount and connector assembly of the present invention;

FIG. 4B is a cross-sectional view taken along line 4B—4B of FIG. 4A;

FIG. 5A is an end elevational view of a fourth embodiment of a submount and connector assembly of the present invention;

FIG. 5B is a cross-sectional view taken along line 5B—5B of FIG. 5A;

FIG. 6A is an end elevational view of a fifth embodiment of the submount and connector assembly of the present invention;

FIG. 6B is a cross-sectional view taken along line 6B—6B of FIG. 6A;

FIG. 8 is a perspective view of a DIP electronic package illustrating the submount and connector assembly of the present invention disposed therein;

FIG. 9A is a perspective view of a multi-function IC package with a plurality of submounts and connector assemblies of the present invention disposed therein; and FIG. 9B is a partial cross-sectional view taken along line 9B—9B of FIG. 9A.

DETAILED DESCRIPTION

Figure 1:
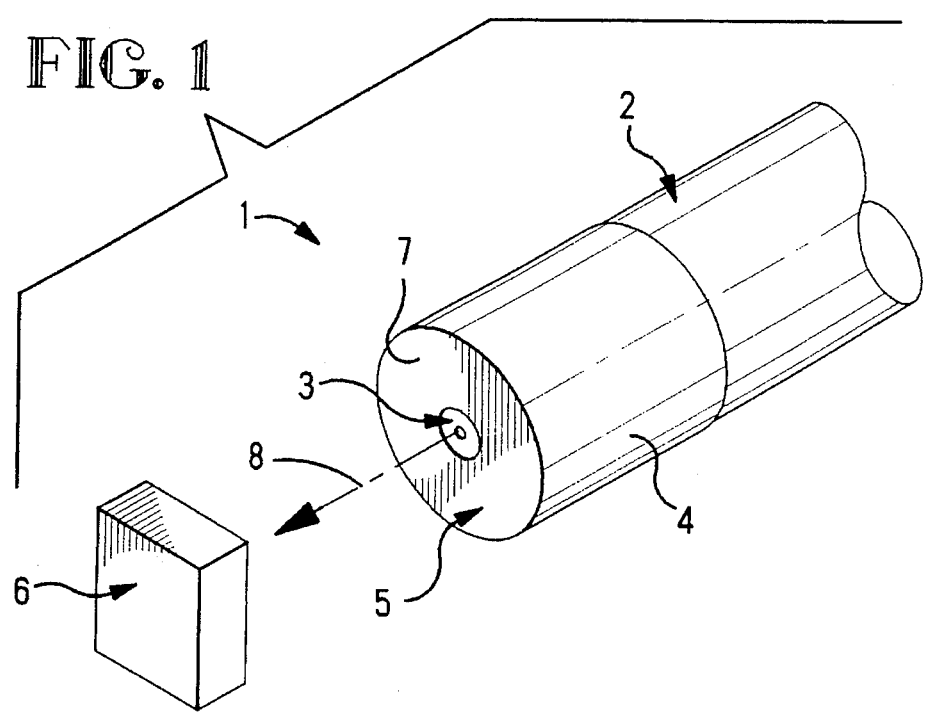
FIG. 1 is an exploded view of a fiber needle and active optoelectronic device to be aligned with and bonded thereto.

FIG. 1 illustrates the inventive concept of passively aligning and bonding an active optical device to an end face and fiber optic needle as described in applicants' aforementioned application Ser. No. 08/217,516. The disclosure of that application is incorporated herein by reference.

Referring to FIG. 1, a metallized fiber 1 is formed by a thick metal layer 2 disposed about the outer circumference of the optical fiber 3. The metal layer 2 is chosen to be of a thickness appropriate to effect bonding and alignment of a device to the endface of the fiber. By way of example a 540 micron outer diameter fiber needle could result from metal deposition on a 125 micron outer diameter single or multi mode fiber to effect the desired device alignment and bonding. This metal layer can be of a particular metal, an alloy or multiple layers of either. At this point the endface of the fiber 5 is polished to form a good surface for bonding and coupling an optical device 6 to the endface 5 of the fiber needle. The resulting fiber, known as a fiber needle, is then electroplated with a thin layer of gold 4 (approximately 5 microns) on the metal portion the endface alone or on the metal portion of the endface and about the circumference of the fiber needle down a short length of the needle. The device 6 is then bonded to the endface 5 making use of the metallized surface 7 which lies in a plane normal to the axis 8 of the metallized fiber 1. The bonding of the device is effected by conventional techniques, such as, but not limited to, application of solder by use of a preform or by plating directly to the endface and/or device or by conventional tinning methods. The solder can be any conventional eutectic solder. Finally, either conductive or non-conductive epoxy attachment methods can be utilized. As can be readily understood from the above description and by reference to FIG. 1, an Active Fiber Needle employs a thick metal coating on an optical fiber to form an extended endface surface on which an active or passive device can be passively aligned and bonded.

Referring to FIGS. 2A and 2B there is illustrated a first embodiment of a mount and connector assembly of the present invention. A fiber optic device such as a fiber needle 1 has an active optical device 6, such as an LED or photodiode, bonded to an endface thereof in a manner illustrated in FIG. 1. The mount assembly includes a cup-shaped housing 10 including a tubular ceramic sleeve 12 and an end cap 14 hermetically sealed thereto. End cap 14 may be fabricated from ceramic or metallic material as desired. Sleeve 12 is provided with a central bore 12A and a counterbore 12B. The tubular sleeve 12 is hermetically sealed along bore 12A to the external circumference surface of fiber needle 1 such as by solder 16. Counterbore 12B provides a cavity for housing the active optical device 6 and a cooperating spring contact 18. Spring contact 18 includes a dome-shaped central portion 18C and a pair of legs 18A and 18B extending from within bore 12B to external surfaces of the submount. These legs are brazed to the ceramic 14. As can be seen the legs 18A and 18B are wrapped around the corners of end cap 14 and provide metallized surfaces to which electrical connections can be made. Central portion 18C of spring contact 18 resiliently engages terminals (not shown) on the active optoelectronic device 6. A convenient method of attachment is for example by soldering by pre-applying a layer of solder to the device or to the central portion 18c, or both. A metallization coating 20 is provided on at least a portion of an inboard end of sleeve 12 for facilitating electrical connection to the metal coating on fiber needle 1.

Spring contact 18 is particularly effective in providing effective dissipation of the joule heating of optoelectronic device 6 since it makes good thermal contact as well as electrical connections across a major area of device 6. Contact 18 is also thermally coupled to the ceramic tubular sleeve 12 which provides a very effective heat sink for dissipating heat from device 6 through tubular sleeve 12 and the metal coating on the exterior of fiber needle 1.

A second embodiment of the mount and connector assembly of the present invention is illustrated in FIGS. 3A and 3B. In this embodiment the tubular sleeve 12 of the cup-shaped mount 10 is also formed of ceramic material and includes a bore 12A and a small counter bore 12B for accommodating the optoelectronic device 6. In this embodiment the end cap 22 is a cylindrical element which is appropriately bonded to a metallization coating 26A which covers a first distal end of tubular ceramic sleeve 12 and a contiguous peripheral portion on the surface of sleeve 12. A wire bond 24 connects electrical terminals on device 6 (not shown) and the metallization coating 26A in order to facilitate electrical connection to an external device. A second metallization coating 26B is provided about a second, distal end of sleeve 12.

As in the first embodiment of FIGS. 2A and 2B sleeve 12 is hermetically sealed to the periphery of fiber needle 1 by means such as solder 16. End cap 22 is also hermetically sealed to metal coating 26A by an appropriate adhesive material. Therefore, cup-shaped housing 10 hermetically encloses optical device 6 and one end of fiber needle 1. However, electrical connection to device 6 is available without disturbing the hermeticity of the cup-shaped housing 10 via wire bond 24 and metallization coating 26A. Also good heat dissipation from device 6 is provided via the thick metal coating of the fiber needle 5, the ceramic material of sleeve 12 and metallization coating 26B.

The third embodiment of the mount and connector assembly of the present invention illustrated in FIGS. 4A and 4B is similar to the second embodiment of FIGS. 3A and 3B. However, in this embodiment the ceramic tubular sleeve 12 is cylindrical rather than rectangular, and a pair of metallic leads 28 are provided which are brazed to the metallization coating 16A on the first distal end of sleeve 12. Other numerals in FIGS. 4A and 4B refer to like parts from FIGS. 3A and 3B.

A fourth embodiment of the mount and connector assembly of the present invention is illustrated in FIGS. 5A and 5B. In this embodiment the tubular sleeve 28 is formed from a metallic material having a rectangular shape in end view. Sleeve 28 is hermetically sealed by solder 16 about a central cylindrical bore to the surface of fiber needle 1 as in the previous embodiments. Since sleeve 28 is formed of a metal, it is necessary to provide an annular glass spacer 30 to achieve electrical isolation between one lead of the optoelectronic device 6 and the metallized surface of the fiber optic needle 1. The cup-shaped housing 10 also includes a ring-shaped metal spacer 32 coupled to device 6 by a wire bond 24 in order to provide for external electrical connections. An end cap 34 is hermetically sealed to ring-shaped metal spacer 32 such as by appropriate solder or adhesive.

As illustrated in FIG. 5A the ring-shaped metal spacer 32 provides the first electrical contact for the assembly and the second electrical contact of the device is provided by the metal sleeve 28.

In the fifth embodiment of the mount and connector assembly of the present invention illustrated in FIGS. 6A and 6B there is provided a ceramic tubular sleeve 12 with associated metallization coatings 16A and 16B, as illustrated in previous described embodiments, and a wire bond 24 for connecting the device 6 to metallization coating 16A. However, in this embodiment the end cap, which together with the sleeve 12 which forms the cup-shaped mount housing 10, may be an amorphous mass of electrically isolating and thermally conductive material 36 which is bonded to metallization layer 16A and device 6. This provides an enclosure about device 6 as well as efficient electrical connections and heat dissipation therefor.

Figure 7:
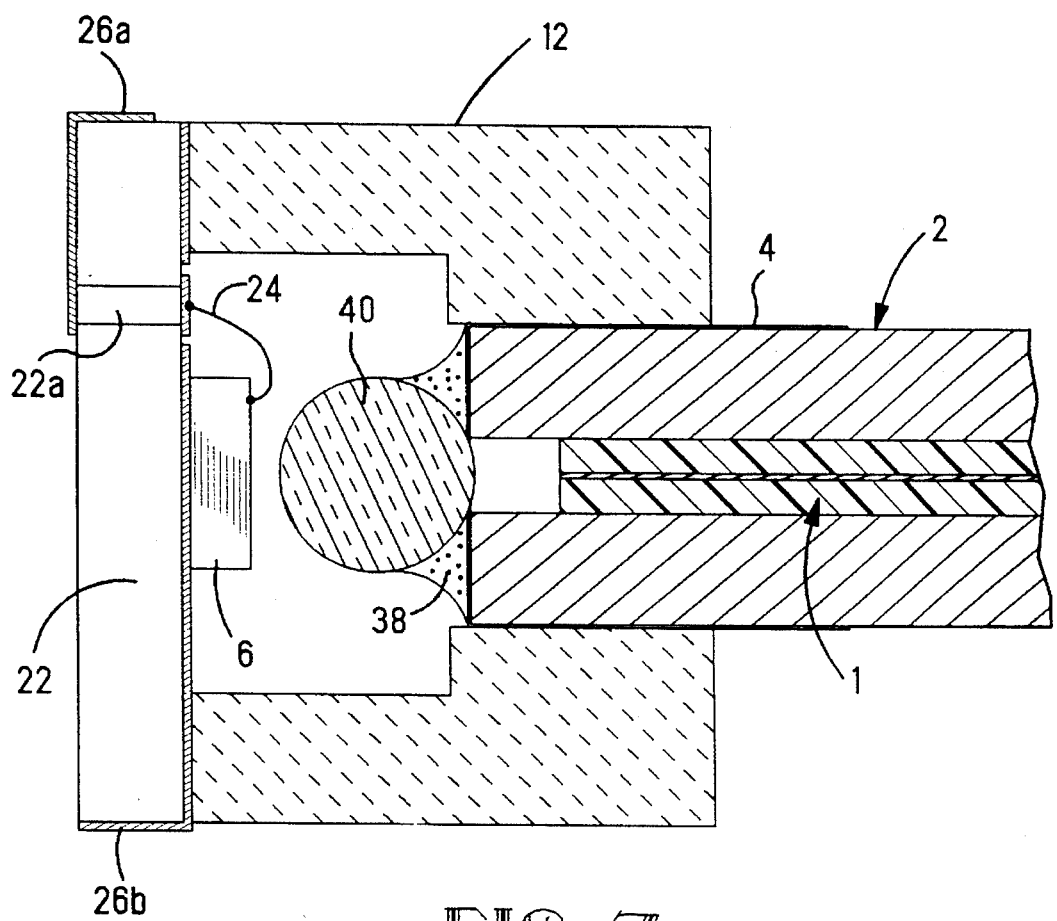
FIG. 7 is a cross-sectional view of a submount and connector assembly of the present invention illustrating both an active and passive optical device therein.

A sixth embodiment of the present invention is illustrated in FIG. 7. In this embodiment the optoelectronic device 6 is secured to a device submount/end cap (ceramic) 22 of the mount cup-shaped housing in optical alignment with the end of fiber needle 1. Also provided is a spherical lens 40 bonded by suitable adhesive 38 to the relatively thick metallic coating 2 of the fiber needle 1. A wire bond 24 is provided between optoelectronic device 6 and a commonly known hermetic electrical feedthrough 22a in the device submount/endcap. This arrangement illustrated in FIG. 7 allows for the coupling of a multi-mode source to a multi-mode fiber with accurate passive alignment of the lens element and active alignment of the active component.

Referring to FIG. 8 there is illustrated a conventional DIP package 40 having a plastic or epoxy housing 44. A portion of the housing is removed to illustrate how the submount 10 of the present invention, as described in any of the previous embodiments, may be surface mounted within the package with the associated fiber needle 1 extending through a sidewall of the housing. This is made possible because of the hermetic sealing, heat dissipation and electrical lead connection properties of the mount assembly 10 of the present invention.

Referring to FIGS. 9A and 9B there is illustrated an additional use of the mount assembly 10 of the present invention. A large multi-function IC package 50, and a plurality of mounts 10 and associated fiber needles 1, according to the present invention are disposed at two opposed ends of a cavity within the package 50. The mounts 10 are appropriately bonded at 60 to the floor of the cavity in the package 50 as best illustrated in FIG. 9B. A lid 58 can then be applied by securing the same to a lid support 59 extending about the periphery of the cavity. The large IC package may include a plurality of processing IC's and appropriate other components such as a four-channel IC receiver 54 and a four-channel driver IC 56. The advantages of the mount assembly of the present invention for integration into large integrated circuit packages should be readily apparent by reference to the illustrations of FIGS. 8, 9A and 9B.

It should be understood that the mount and connector assembly of the present invention may be modified as would occur to one of ordinary skill in the art without departing from the spirit and scope of the present invention.

We claim:

1. A connector assembly comprising:
   a substantially cylindrical optical fiber having a first end and a second end, with an optic axis disposed along the center of said optical fiber between said ends;
   a metallic surface of a prescribed thickness disposed circumferentially about said optical fiber;
   a first face at said first end and a second face at said second end, said ends being substantially orthogonal to said optic axis;
   an optoelectronic device directly bonded to said first face, whereby light impingent on or transmitted from said device is propagated through said optical fiber;
   a cup-shaped housing having an open end and a closed end with sidewalls therebetween, said cup-shaped housing being disposed over the first end of said optical fiber for hermetically enclosing said optoelectronic device and the first end of the optical fiber, said housing being hermetically sealed to the metallic surface disposed circumferentially about said optical fiber; and
   electrical lead means connected to said optoelectronic device and extending through said housing for facilitating connection to an external device.

2. A connector assembly as recited in claim 1 wherein said electrical lead means comprises a spring metal strip disposed in said housing in opposing relationship to electrical terminals of said optoelectronic device on said first face, said spring metal strip having a bowed portion resiliently soldered to electrical terminals of said optoelectronic device to make electrical contact therewith, said spring metal strip having at least one leg portion extending from said bowed portion through said housing to facilitate connection to an external device.

3. A connector assembly as recited in claim 2 wherein said cup-shaped housing includes a tubular sleeve defining said sidewalls and said open end, and an end cap forming said closed end, said at least one leg of said spring metal strip extending through said housing between said first portion and said end cap, said end cap being hermetically sealed to said tubular portion.

4. A connector assembly as recited in claim 3 wherein said tubular sleeve is formed of heat conductive and electrically insulating material to thereby provide a heat sink for said optoelectronic device connected through said spring metal strip to said optoelectronic device.

5. A connector assembly as recited in claim 4 wherein said material is ceramic.

6. A connector assembly as recited in claim 1 wherein said cup-shaped housing is formed of heat conductive, electrically insulating material to thereby provide a heat sink for said optoelectronic device connected through said electrical lead means to said optoelectronic device.

7. A connector assembly as recited in claim 6 wherein said material is ceramic.

8. A connector assembly as recited in claim 1 wherein said electrical lead means comprises a wire bond connected at a first end thereof to said optoelectronic device and at a second end to a metallized coating on an exterior surface of said cup-shaped housing.

9. A connector assembly as recited in claim 1 wherein said cup-shaped housing comprises:

a tubular sleeve forming said sidewalls and having a first distal end disposed adjacent to said optoelectronic device, and a second distal end hermetically sealed to the metallic circumferential surface of the optical fiber;

said electrical lead means including a first substantially continuous metallic coating on an end face of said first distal end and a contiguous external surface of the tubular sleeve, and a wire bond connecting the optoelectronic device to said first metallic coating;

a second substantially continuous metallic coating on an end face of said second distal end and a contiguous external surface of the tubular sleeve;

said second metallic coating being connected to the metallic circumferential surface of the optical fiber; and an end cap defining the closed end of the cup-shaped housing secured to said first metallic coating.

10. A connector assembly as recited in claim 9 further comprising a pair of electrical leads secured to said first metallic coating.

11. A connector assembly as recited in claim 10 wherein said tubular sleeve is formed of a heat conductive, electrically insulating material.

12. A connector assembly as recited in claim 11 wherein the tubular sleeve comprises a ceramic material and the end cap a metal or ceramic material.

13. A connector assembly as recited in claim 9 wherein said tubular sleeve is formed of a heat conductive, electrically insulating material.

14. A connector assembly as recited in claim 13 wherein the tubular sleeve comprises a ceramic material and the end cap a metal or ceramic material.

15. A connector assembly as recited in claim 9 wherein said end cap is an amorphous mass of thermally conductive and electrically insulative material encapsulating the optoelectronic device and the wire bond, and is bonded to said first metallized coating.

16. A connector assembly as recited in claim 15 wherein said tubular sleeve comprises a ceramic material.

17. A connector assembly as recited in claim 1 wherein said cup-shaped housing comprises:

a metallic tubular sleeve forming said sidewalls and open end, having a first distal end disposed adjacent to said optoelectronic device, and a second distal end hermetically sealed to the metallic circumferential surface of the optical fiber;

an annular spacer of heat conductive, electrically insulating material secured to an end face of said first distal end;

said electrical lead means including a ring-shaped metallic spacer secured to the heat conductive, electrically insulating spacer, and a wire bond connecting the optoelectronic device to said annular metallic spacer;

and an end cap defining the closed end of the cup-shaped housing secured to said ring-shaped metallic spacer.

18. The connector assembly as recited in claim 17 wherein said annular spacer of heat conductive, electrically insulating material is glass.

19. The connector assembly as recited in claim 1 wherein said optical fiber comprises a fiber needle having a first contact and a second contact and the electrical lead means of the cup-shaped housing is electrically connected to said first contact.

20. A mount for an optoelectronic device for use in connecting the optoelectronic device to one end of a metal coated optical fiber, comprising:

a cup-shaped housing having an open end and a closed end with sidewalls therebetween, said cup-shaped housing having a cavity for accommodating a first end of said optical fiber for hermetically enclosing said optoelectronic device and the first end of said fiber;

a spring metal strip disposed in said housing in opposing relationship to electrical terminals of said optoelectronic device, said metal strip having a bowed portion secured to electrical terminals of said optoelectronic device to make electrical contact therewith, said spring metal strip having at least one leg portion extending through said housing to facilitate connection to an external device.

21. A mount as recited in claim 20 wherein said optical fiber is a fiber needle including a first contact and second contract, and said cup-shaped housing is electrically connectable to said first contact.

22. A mount as recited in claim 20 wherein said cup-shaped housing includes a tubular sleeve defining said sidewalls and said open end, and a end cap forming said closed end, said at least one leg of said spring metal strip extending through said housing between said first portion and said end cap, said end cap being hermetically sealed to said tubular portion.

23. A mount as recited in claim 22 wherein said tubular sleeve is formed of heat conductive and electrically insulating material to thereby provide a heat sink for said optoelectronic device connected through said spring metal strip to said optoelectronic device.

24. A mount as recited in claim 23 wherein said material is ceramic.

25. A mount as recited in claim 20 wherein said cup-shaped housing is formed of heat conductive, electrically insulating material to thereby provide a heat sink for said optoelectronic device connected through said electrical lead means to said optoelectronic device.

26. A mount as recited in claim 25 wherein said material is ceramic.

27. A mount as recited in claim 20 wherein said electrical lead means comprises a wire bond connected at a first end thereof to said optoelectronic device and at a second end to a metallized coating that wraps around from the interior to the exterior surface of said cup-shaped housing.

28. A mount as recited in claim 20 wherein said cup-shaped housing comprises:

a tubular sleeve forming said sidewalls and having a first distal end disposed adjacent to said optoelectronic device, and a second distal end hermetically sealed to the metallic coating of the optical fiber;

said electrical lead means including a first substantially continuous metallic coating on an end face of said first distal end and a contiguous external surface of the tubular sleeve, and a wire bond connecting the optoelectronic device to said first metallic coating;

a second substantially continuous metallic coating on an end face of said second distal end and a contiguous external surface of the tubular sleeve;

said second metallic coating being connected to the metallic circumferential surface of the optical fiber; and an end cap defining the closed end of the cup-shaped housing secured to said first metallic coating.

29. A mount as recited in claim 28 further comprising a pair of electrical leads secured to said first metallic coating.

30. A mount as recited in claim 29 wherein said tubular sleeve is formed of a heat conductive, electrically insulating material.

31. A mount as recited in claim 30 wherein the tubular sleeve comprises a ceramic material and the end cap metal or ceramic material.

32. A mount as recited in claim 28 wherein said tubular sleeve is formed of a heat conductive, electrically insulating material.

33. A mount as recited in claim 32 wherein the tubular sleeve comprises a ceramic material and the end cap metal or ceramic material.

34. A mount as recited in claim 28 wherein said end cap is an amorphous mass of thermally and electrically conductive material encapsulating the optoelectronic device and the wire bond, and is bonded to said first metallized coating.

35. A mount as recited in claim 34 wherein said tubular sleeve comprises a ceramic material.

36. A connector assembly as recited in claim 20 wherein said cup-shaped housing comprises:

a metallic tubular sleeve forming said sidewalls and open end, having a first distal end disposed adjacent to said optoelectronic device, and a second distal end hermetically sealed to the metallic circumferential surface of the optical fiber;

an annular spacer of heat conductive, electrically insulating material secured to fan end face of said first distal end;

said electrical lead means including a ring-shaped metallic spacer secured to the heat conductive, electrically insulating spacer, and a wire bond connecting the optoelectronic device to said ring-shaped metallic spacer; and an end cap defining the closed end of the cup-shaped housing secured to said annular metallic spacer.

37. A mount as recited in claim 20 further including heat dissipation means for providing a heat conductive path between the optoelectronic device and the metal coating on the optical fiber.

38. A connector assembly comprising:

a substantially cylindrical optical fiber having a first end and a second end, with an optic axis disposed along the center of said optical fiber between said ends;

a metallic surface of a prescribed thickness disposed circumferentially about said optical fiber;

a first face at said first end and a second face at said second end substantially orthogonal to said optic axis;

a passive optical device bonded to said first face, whereby light impingent on or transmitted from said device is propagated through said optical fiber;

a cup-shaped housing having an open end and a closed end with sidewalls therebetween, said cup-shaped housing being disposed over the first end of said optical fiber for hermetically enclosing an optoelectronic device and the first end of the optical fiber, said housing being hermetically sealed to the metallic surface disposed circumferentially about said optical fiber and said optoelectronic device secured to an endcap secured to a distal end of the cup-shaped housing and optically aligned with said passive optical device and said optical fiber; and electrical lead means connected to said optoelectronic device and extending through said housing for facilitating connection to an external device.

39. A connector assembly as recited in claim 38, wherein said passive optical device is a spherical lens.

* * * * *